United States Patent
Ogasawara et al.

(10) Patent No.: US 12,437,536 B2
(45) Date of Patent: Oct. 7, 2025

(54) IMAGE PROCESSING APPARATUS, IMAGE PROCESSING METHOD, AND STORAGE MEDIUM THAT SELECT AN IMAGE FROM AN IMAGE GROUP BASED ON AN OBTAINED SCORE

(71) Applicant: CANON KABUSHIKI KAISHA, Tokyo (JP)

(72) Inventors: Kazuya Ogasawara, Kanagawa (JP); Takayuki Yamada, Kanagawa (JP); Kazuya Onuki, Kanagawa (JP); Shinjiro Hori, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 550 days.

(21) Appl. No.: 17/533,627

(22) Filed: Nov. 23, 2021

(65) Prior Publication Data

US 2022/0172470 A1 Jun. 2, 2022

(30) Foreign Application Priority Data

Nov. 30, 2020 (JP) .................................. 2020-198579

(51) Int. Cl.
*G06V 20/30* (2022.01)
*G06T 7/00* (2017.01)
(Continued)

(52) U.S. Cl.
CPC ............ *G06V 20/30* (2022.01); *G06T 7/0002* (2013.01); *G06T 11/60* (2013.01); *G06T 2207/30168* (2013.01); *G06V 40/161* (2022.01)

(58) Field of Classification Search
CPC ...... G06V 20/30; G06V 40/161; G06V 10/82; G06V 40/173; G06T 7/0002; G06T 11/60; G06T 2207/30168
See application file for complete search history.

(56) References Cited

U.S. PATENT DOCUMENTS

| 8,620,105 B2 | 12/2013 | Hori et al. |
| 9,052,742 B2 | 6/2015 | Hori et al. |

(Continued)

FOREIGN PATENT DOCUMENTS

| JP | 2006-227994 A | 8/2006 |
| JP | 2007-193616 A | 8/2007 |

(Continued)

OTHER PUBLICATIONS

Office Action issued Sep. 17, 2024, in related Japanese Patent Application No. 2020-198579, with English translation (12 pages).

(Continued)

*Primary Examiner* — Wassim Mahrouka
(74) *Attorney, Agent, or Firm* — Venable LLP

(57) ABSTRACT

An image processing apparatus includes first and second designation units designating first and second image groups, an analysis unit analyzing images included in the first and second image groups, a determination unit determining a reference, based on an analysis result of the second image group, and a selection unit selecting a first image group image, based on the reference and an analysis result of the first image group. As the reference, the determination unit determines a score reference that gives a score to an image. A scoring unit scores the first image group, based on the score reference and the first image group analysis result. The selection unit selects an image from the first image group, based on an obtained score. The determination unit determines the score reference that uses at least one of an average value and a median value of the analysis result of the second image group.

20 Claims, 12 Drawing Sheets

(51) Int. Cl.
*G06T 11/60* (2006.01)
*G06V 40/16* (2022.01)

(56) References Cited

U.S. PATENT DOCUMENTS

| | | | |
|---|---|---|---|
| 9,704,221 | B2 | 7/2017 | Hori et al. |
| 10,699,400 | B2 | 6/2020 | Hori et al. |
| 10,726,539 | B2 | 7/2020 | Hori et al. |
| 10,742,823 | B2 | 8/2020 | Iguchi et al. |
| 11,089,170 | B2 | 8/2021 | Kunieda et al. |
| 2015/0092070 | A1* | 4/2015 | Hatano .................. G06V 20/30 348/211.3 |
| 2016/0179846 | A1* | 6/2016 | Tobita .................. G06V 10/762 382/305 |
| 2016/0371536 | A1* | 12/2016 | Yamaji .................. G06F 16/583 |
| 2019/0379795 | A1* | 12/2019 | Yamaji ............... H04N 1/00143 |
| 2020/0388062 | A1 | 12/2020 | Kunieda et al. |
| 2020/0388063 | A1 | 12/2020 | Kunieda et al. |
| 2021/0049201 | A1* | 2/2021 | Noguchi .............. G06V 40/173 |
| 2022/0189199 | A1* | 6/2022 | Liu ........................ G06F 16/55 |

FOREIGN PATENT DOCUMENTS

| | | |
|---|---|---|
| JP | 2008-065670 A | 3/2008 |
| JP | 2008-217335 A | 9/2008 |
| JP | 2012-058940 A | 3/2012 |
| JP | 2017068331 A | 4/2017 |
| JP | 2017-117404 A | 6/2017 |
| JP | 2018-045582 A | 3/2018 |
| JP | 2020-046902 A | 3/2020 |

OTHER PUBLICATIONS

Search Report issued Sep. 5, 2024, in related Japanese Patent Application No. 2020-198579, with English translation (35 pages).
Decision of Refusal issued Jan. 7, 2025, in related Japanese Patent Application No. 2020-198579, with English translation (6 pages).

* cited by examiner

| IMAGE ID | SHOOTING DATE AND TIME | FOCUS | THE NUMBER OF FACES | FACE IMAGE ID | INDIVIDUAL ID | | | | | | | | | | OBJECT |
|---|---|---|---|---|---|---|---|---|---|---|---|---|---|---|---|
| | | | | | 1 | | | 2 | | | 3 | | | ... | |
| | | | | | UPPER LEFT POSITION | LOWER RIGHT POSITION | SIMILARITY | UPPER LEFT POSITION | LOWER RIGHT POSITION | SIMILARITY | UPPER LEFT POSITION | LOWER RIGHT POSITION | SIMILARITY | | |
| 001 | 2015/7/1 10h11m12s | DESIRABLE | 4 | 1 | 40, 40 | 40, 40 | 0.95 | 90, 40 | 115, 65 | 0.85 | 10, 20 | 25, 35 | 0.88 | ... | - |
| 002 | 2015/7/1 10h12m30s | DESIRABLE | 2 | 2 | 50, 100 | 50, 100 | 0.12 | 150, 125 | 190, 165 | 0.94 | - | - | - | ... | FLOWER |
| 003 | 2015/7/1 10h15m54s | DESIRABLE | 0 | - | - | - | - | - | - | - | - | - | - | ... | DOG |
| ... | ... | ... | ... | ... | ... | ... | ... | ... | ... | ... | ... | ... | ... | ... | ... |

FIG.6

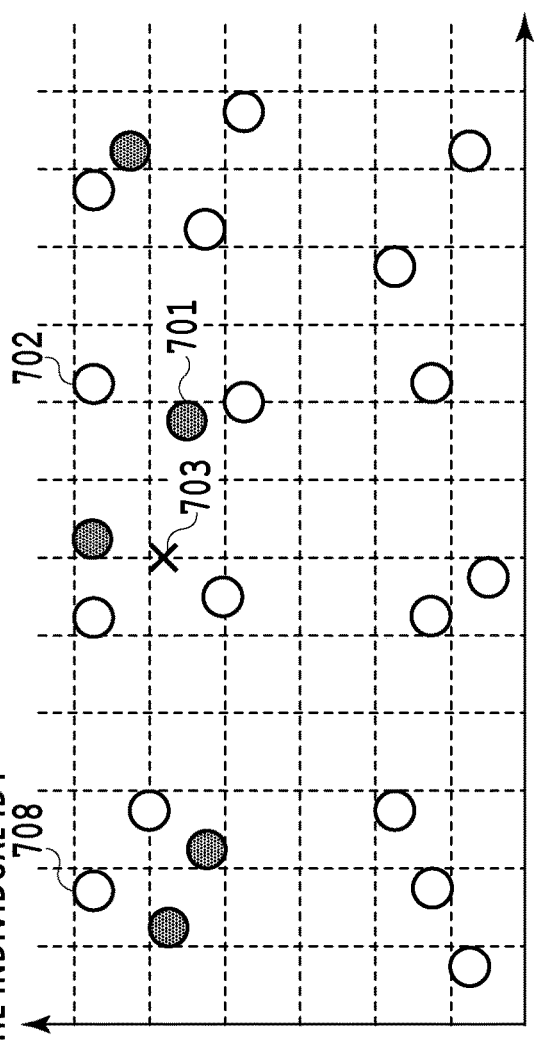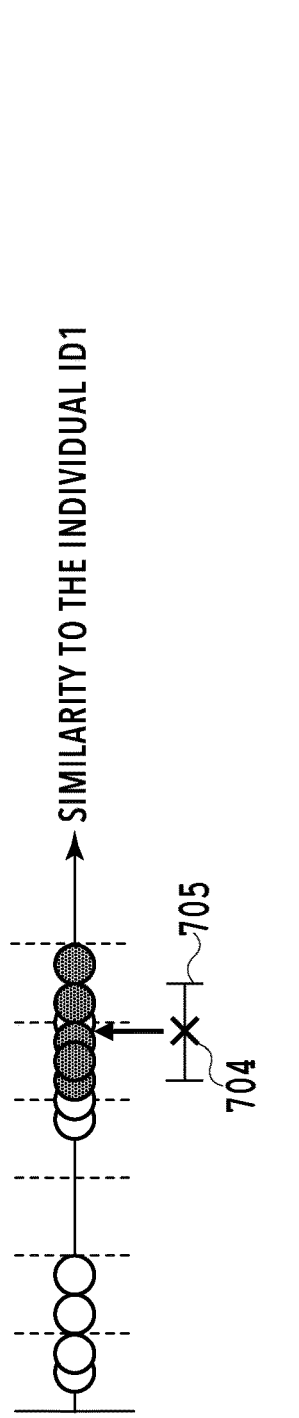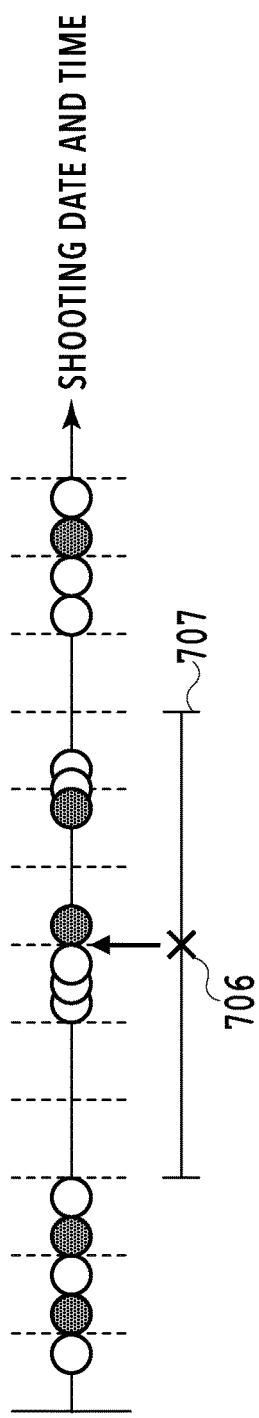

FIG.10Q

IMAGE PROCESSING APPARATUS, IMAGE PROCESSING METHOD, AND STORAGE MEDIUM THAT SELECT AN IMAGE FROM AN IMAGE GROUP BASED ON AN OBTAINED SCORE

BACKGROUND OF THE INVENTION

Cross-Reference to Priority Application

This application claims the benefit of Japanese Patent Application No. 2020-198579, filed Nov. 30, 2020, which is hereby incorporated by reference herein in its entirety.

FIELD OF THE INVENTION

The present invention relates to a technology for selecting one or more images from multiple images according to a predetermined reference.

DESCRIPTION OF THE RELATED ART

There is an automatic layout technology that automatically selects an image for creating an album from multiple images, automatically determines a template for the album, and automatically allocates the image to the template.

Japanese Patent Laid-Open No. 2020-046902 (hereafter, referred to as the '902 document) discloses a technology that sorts multiple images of album candidates into multiple image groups, so as to make a group of images whose similarity degrees are equal to or more than a threshold value, and extracts an image from the images included in the sorted multiple image groups. In the '902 document, the ratio of images to be extracted from each image group is determined by the ratio of the numbers of images included in the sorted image groups or by the user designating the extraction ratio of each image group.

In the method described in the '902 document, there is a possibility that images in line with the user's intention are not appropriately selected.

SUMMARY OF THE INVENTION

The image processing apparatus according to an embodiment of the present invention includes a first designation unit configured to designate a first image group, a second designation unit configured to designate a second image group, an analysis unit configured to analyze each image included in the first image group and the second image group, a determination unit configured to determine a reference, based on an analysis result of the second image group, and a selection unit configured to select an image from the first image group, based on the reference and an analysis result of the first image group.

Further features of the present invention will become apparent from the following description of exemplary embodiments with reference to the attached drawings.

BRIEF DESCRIPTION OF THE DRAWINGS

FIG. 6 is a diagram illustrating feature amounts;

FIG. 7A through FIG. 7C are diagrams illustrating feature amounts in a feature amount space;

DESCRIPTION OF THE EMBODIMENTS

Hereafter, a detailed explanation will be given of embodiments of the present invention with reference to the attached drawings. The following embodiments do not limit the present invention according to the scope of the patent claims, and all combinations of the characteristics explained in the present embodiments are not necessarily essential to the solution of the present invention. The same constituent elements are assigned with the same reference numbers, so that the explanations thereof will be omitted.

First Embodiment

In the present embodiment, an explanation will be given with the example of a method in which an application (hereafter, may also be referred to as an "app") for creating an album is operated by an image processing apparatus, so as to generate an automatic layout. In the following explanation, unless otherwise specified, an "image" includes a still image, a moving image, and a frame image extracted from a moving image. Further, an image here may include a still image, a moving image, and a frame image in a moving image that are held on a network, such as in a service on a network or a storage on a network, and can be obtained via the network.

Figure 1:
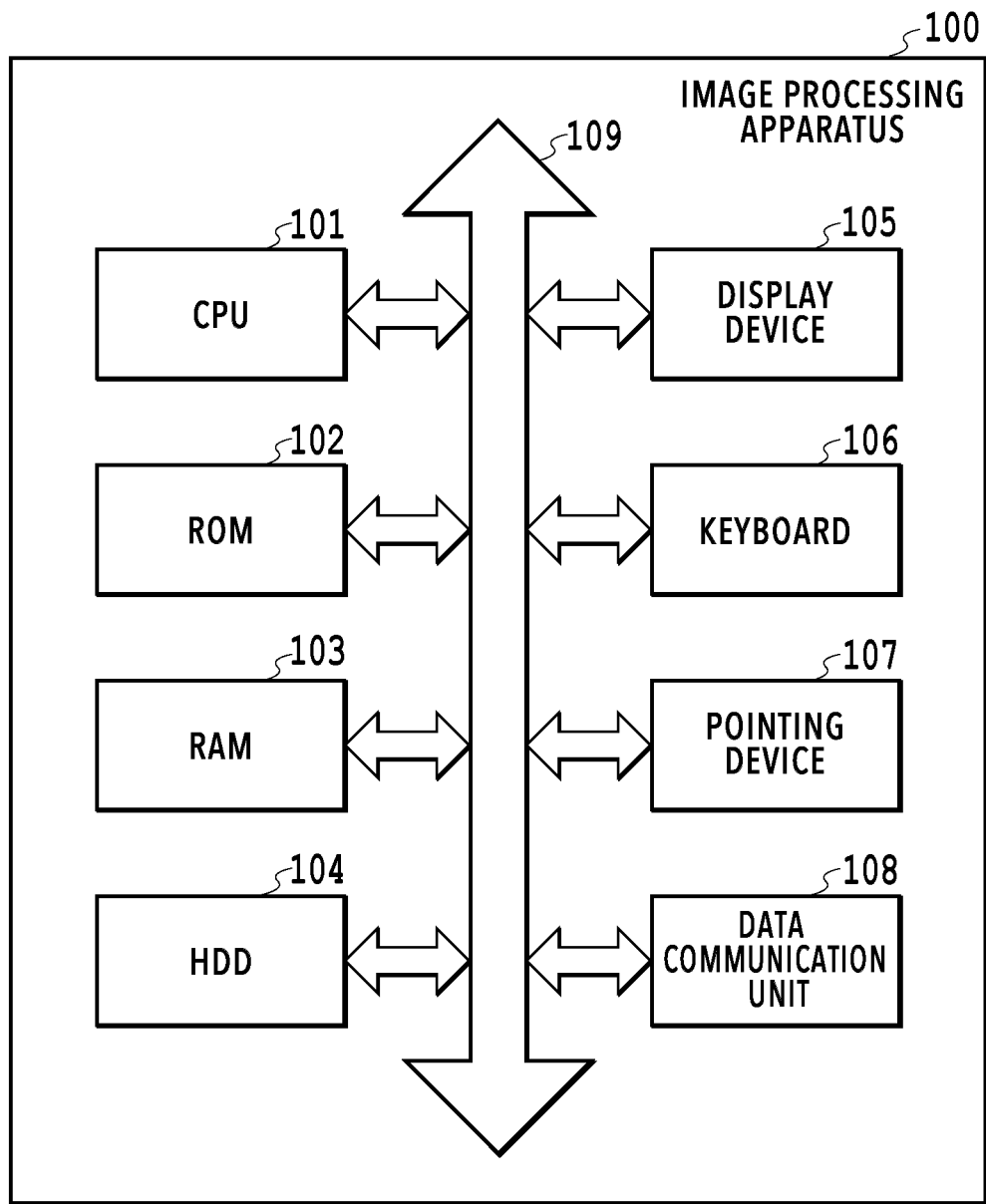
FIG. 1 is a block diagram illustrating a hardware configuration of an image processing apparatus.

FIG. 1 is a block diagram illustrating a hardware configuration of an image processing apparatus. Examples of the image processing apparatus 100 include a personal computer (hereafter, referred to as a PC), a smartphone, etc. In the present embodiment, an explanation will be given on the premise that the image processing apparatus is a PC. The image processing apparatus 100 includes a CPU 101, a ROM 102, a RAM 103, a HDD 104, a display device 105, a keyboard 106, a pointing device 107, and a data communication unit 108.

The CPU (Central Processing Unit/Processor) 101 comprehensively controls the image processing apparatus 100 to implement the operation of the present embodiment by reading out a program that is stored in the ROM 102 onto the RAM 103 and executing the program, for example. Although the number of CPUs is one in FIG. 1, a configuration with multiple CPUs is also possible. The ROM 102 is a general-purpose ROM, which stores a program to be executed by the CPU 101, for example. The RAM 103 is a general-purpose RAM, which is used as a working memory for temporarily storing various kinds of information at the timing where the CPU 101 executes a program, for example. The HDD (hard disk) 104 is a storage medium (storage unit)

for storing an image file, a database that holds processing results of image analysis, or the like, a template to be used by the album creation application, etc.

The display device 105 displays a user interface (UI) of the present embodiment and an electronic album as a layout result of image data (hereafter, also referred to as an "image") for the user. The keyboard 106 and the pointing device 107 receive an instruction operation from the user. The display device 105 may be equipped with a touch sensor function. For example, the keyboard 106 is used by the user to input the number of double spreads of the album to be created on the UI, which is displayed on the display device 105. For example, the pointing device 107 is used by the user to click a button on the UI, which is displayed on the display device 105.

The data communication unit 108 performs communication with an external device via a wired or wireless network, etc. For example, the data communication unit 108 transmits the data that has been laid out by the automatic layout function to a printer or server that is capable of communicating with the image processing apparatus 100. The data bus 109 connects the respective blocks of FIG. 1 in a mutually communicable manner.

The configuration illustrated in FIG. 1 is merely an example and is not limited as such. For example, it is also possible that the image processing apparatus 100 does not include the display device 105 and the UI is displayed on an external display device.

The album creation application in the present embodiment is stored in the HDD 104. Then, as will be described later, the user selects the icon of the application that is displayed on the display device 105 with the pointing device 107 and provides a clicking or a double-clicking operation, or the like, for the activation.

Figure 2:
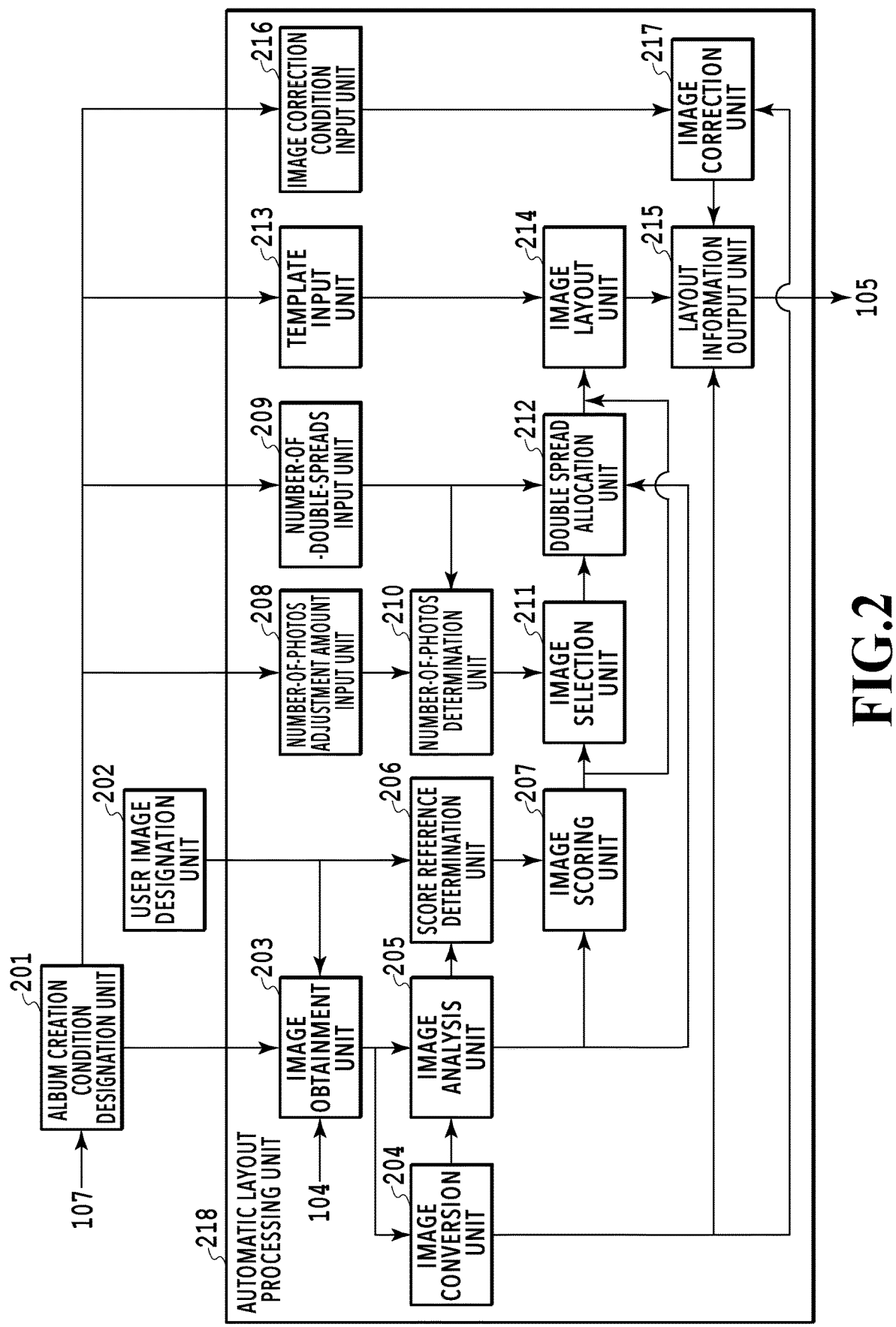
FIG. 2 is a software block diagram of an album creation application.

FIG. 2 is a software block diagram of the album creation application. The album creation application includes an album creation condition designation unit 201, a user image designation unit 202, and an automatic layout processing unit 218. The automatic layout processing unit 218 includes an image obtainment unit 203, the image conversion unit 204, an image analysis unit 205, a score reference determination unit 206, an image scoring unit 207, a number-of-photos adjustment amount input unit 208, a number-of-double-spreads input unit 209, a number-of-photos determination unit 210, an image selection unit 211, a double spread allocation unit 212, a template input unit 213, an image layout unit 214, a layout information output unit 215, an image correction condition input unit 216, and an image correction unit 217.

Each program module corresponding to the respective constituent elements illustrated in FIG. 2 is included in the above-described album creation application. Further, if the CPU 101 executes each program module, the CPU 101 thereby functions as the respective constituent elements illustrated in FIG. 2. Hereafter, an explanation of the respective constituent elements illustrated in FIG. 2 will be given on the premise that the respective constituent elements execute various processing. Further, in FIG. 2, a software block diagram, relating to the automatic layout processing unit 218 that executes the automatic layout function, is illustrated in particular.

The album creation condition designation unit 201 designates an album creation condition for the automatic layout processing unit 218 according to the UI operation with the pointing device 107. In the present embodiment, as the album creation condition, it is possible to designate an album candidate image group, including candidate images to be used for the album (also referred to as the first image group), the number of double spreads, the kind of template, and whether or not image correction is performed on the album. Further, it is possible to designate the number-of-photos adjustment amount, which is for adjusting the number of photos to be arranged on the album, and the product material for creation of the album. The album candidate image group may be designated based on the attribute information or the attachment information of individual images, such as the shooting dates and times, or may be designated based on the structure of the file system that includes images, such as a device and a directory. Further, it is also possible that two given images are to be designated, so that all the images captured between the dates and times at which the respective image data were captured will be set as the target image group. In the present specification, a "double spread" corresponds to one display window in the case of displaying, and, in the case of printed products, a "double spread" corresponds to a pair of pages adjacent to each other that can be viewed at one time by the user if the user opens the book (that is, corresponding to two pages). Regarding the two pages in a double spread, there are a case when a double spread is formed by adjacently biding pages that are respectively printed on different printing paper and a case when a double spread is formed by folding pages that are printed on one sheet of printing paper in the middle.

The user image designation unit 202 allows the user to designate a user image group (also referred to as the second image group) desired to be adopted in the album, which represents the user's hobby or preference. As the user image group, it is possible to select one or more, but equal to or less than the number of photos that is determined by the number-of-photos determination unit 210. Further, it is also possible that the image groups used in the albums created in the past are saved in the HDD 104 or on the cloud that can be accessed via the data communication unit 108, so as to allow the user to perform designation from the image groups, in addition to the above-described designation method. The images designated here may or may not be included in the images designated by the album creation condition designation unit 201. That is, the user image group may or may not be included in the album candidate image group.

The image obtainment unit 203 obtains the image groups designated by the album creation condition designation unit 201 and the user image designation unit 202 from the HDD 104. As meta information, the image obtainment unit 203 outputs, to the image analysis unit 205, the following information included in an obtained image, i.e., the information of the width and the height of the image, the shooting date and time information included in Exif information at the time of image-capturing, the information indicating whether the image is included in the user image group, etc. Further, the image obtainment unit 203 outputs the obtained image data to the image conversion unit 204. Identification information is added to each image, and the meta information that is output to the image analysis unit 205 and the image data that is output to the image analysis unit 205 via the later-described image conversion unit 204 can be associated with each other by the image analysis unit 205.

Examples of images stored in the HDD 104 include still images and frame images that are cut out from a moving image. Still images and frame images are obtained from an image-capturing device such as a digital camera and a smart device. The image-capturing device may be included in the image processing apparatus 100 or may be included in an external device. In a case when the image-capturing device is an external device, images are obtained via the data communication unit 108. Further, the still images and the cut-out images may be images obtained from a network or a server via the data communication unit 108. Examples of images obtained from a network or a server include social networking service images (hereafter, referred to as "SNS images"). For each image, the program executed by the CPU 101 analyzes data attached to the image, so as to determine where the image is saved. It is also possible to obtain an image from an SNS via an application so that thereby the source of the SNS image is managed in the application. The images are not limited to the above-described images and may be another type of image.

The image conversion unit 204 converts the image data that is input from the image obtainment unit 203 into the pixel count and color information to be used by the image analysis unit 205, and outputs the pixel count and the color information to the image analysis unit 205. In the present embodiment, images are converted into a predetermined pixel count, such as a size of which the short side is set to four hundred twenty pixels and the original ratio of the respective sides is maintained for the long side. Further, for analyzing the color, the conversion is performed in a unified manner into a color space such as sRGB. In this way, the image conversion unit 204 performs conversion into an analysis image having a unified pixel count and color space. The image conversion unit 204 outputs the converted image to the image analysis unit 205. Further, the image conversion unit 204 outputs the image to the layout information output unit 215 and the image correction unit 217.

The image analysis unit 205 analyzes the image data of an analysis image that is input from the image conversion unit 204 by the later-described method, in order to obtain image feature amounts. As the analysis process, each process of estimating the degree of focus, face detection, personal recognition, and object determination is executed, so that these image feature amounts are obtained. Other examples of the image feature amounts include a tint, brightness, resolution, data amount, degree of blurring/shaking, etc., although even other image feature amounts may be used. The image analysis unit 205 extracts and combines necessary information from meta information, which is input from the image obtainment unit 203, in order to output the necessary information as a feature amount to the score reference determination unit 206 together with the above-described image feature amounts. Further, the image analysis unit 205 also outputs the feature amounts of an analysis result to the image scoring unit 207. Further, the image analysis unit 205 outputs the shooting date and time information to the double spread allocation unit 212.

By use of the feature amounts of the user image group that is designated by the user image designation unit 202 from among the feature amounts obtained from the image analysis unit 205, the score reference determination unit 206 determines the score reference, which is used by the image scoring unit 207 to calculate a score in the later-described method, and provides the score reference to the image scoring unit 207. The herein-mentioned score is an index that is indicative of the appropriateness for layout of each image, and a higher score is indicative of being more suitable for layout. Further, the score reference is a reference for the image scoring unit 207 to calculate a score, and, by determining the score reference based on the feature amounts of the user image group, it is possible to select images in line with the user's intention.

The image scoring unit 207 scores each image of the album candidate image group by use of the score reference that is determined by the score reference determination unit 206 and the feature amounts that are obtained from the image analysis unit 205. The result of scoring is output to the image selection unit 211 and the image layout unit 214.

The number-of-photos adjustment amount input unit 208 inputs the adjustment amount, which is designated by the album creation condition designation unit 201 for adjusting the number of photos to be arranged in the album, to the number-of-photos determination unit 210.

The number-of-double-spreads input unit 209 inputs the number of double spreads of an album, which is designated by the album creation condition designation unit 201, to the number-of-photos determination unit 210 and the double spread allocation unit 212. The number of double spreads in an album corresponds to the number of multiple templates in which multiple images are arranged.

The number-of-photos determination unit 210 determines the total number of photos to configure the album, based on the adjustment amount that is designated by the number-of-photos adjustment amount input unit 208 and the number of double spreads that is designated by the number-of-double-spreads input unit 209, and inputs the total number of photos to the image selection unit 211.

The image selection unit 211 selects images, based on the number of photos that is input from the number-of-photos determination unit 210 and the scores that are calculated by the image scoring unit 207, and creates a list of layout image group (also referred to as the third image group) to be provided to the double spread allocation unit 212 and used for the album.

The double spread allocation unit 212 allocates each image of the image group, which is selected by the image selection unit 211, to the double spreads by use of the shooting date information. Although the example in which the allocation is performed on a per double spread basis is explained here, it is also possible that the allocation is performed on a per page basis.

The template input unit 213 reads, from the HDD 104, multiple templates according to the template information, which is designated by the album creation condition designation unit 201, and inputs the multiple templates to the image layout unit 214.

The image layout unit 214 performs the layout processing for images of each double spread. Specifically, for the processing-target double spread, a template suitable for the images selected by the image selection unit 211 is determined from among the multiple templates that are input by the template input unit 213, so that the layout of each image will be determined.

The layout information output unit 215 outputs layout information to be displayed on the display device 105 according to the layout which is determined by the image layout unit 214. For example, the layout information is bitmap data in which the data of the selected images, which are selected by the image selection unit 211, is laid out in the determined template.

The image correction condition input unit 216 provides the image correction unit 217 with ON/OFF information regarding image correction, which is designated by the album creation condition designation unit 201. Examples of the type of correction include luminance correction, dodging correction, red-eye correction, contrast correction, etc. ON or OFF of image correction may be designated for each type of correction or may be collectively designated for all types.

The image correction unit 217 performs correction on the layout information that is held by the layout information output unit 215, based on the image correction condition that is received by the image correction condition input unit 216.

The pixel count of an image to be processed by the image conversion unit 204 and, then, by the image correction unit 217 can be changed according to the size of the layout image that is determined by the image layout unit 214. Although the image correction is performed to each image after generating a layout image in the present embodiment, there is no limitation as such, and it is also possible to perform the correction on each image before performing layout for a double spread or a page.

If the album creation application is installed in the image processing apparatus 100, an activation icon is displayed on the top screen (desktop) of the OS (operating system) running on the image processing apparatus 100. If the user double-clicks the activation icon displayed on the display device 105 with the pointing device 107, the program for the app that is saved in the HDD 104 is loaded into the RAM 103 and executed by the CPU 101, so that the app is thereby activated.

<Example of the Display Screen>

Figure 3:
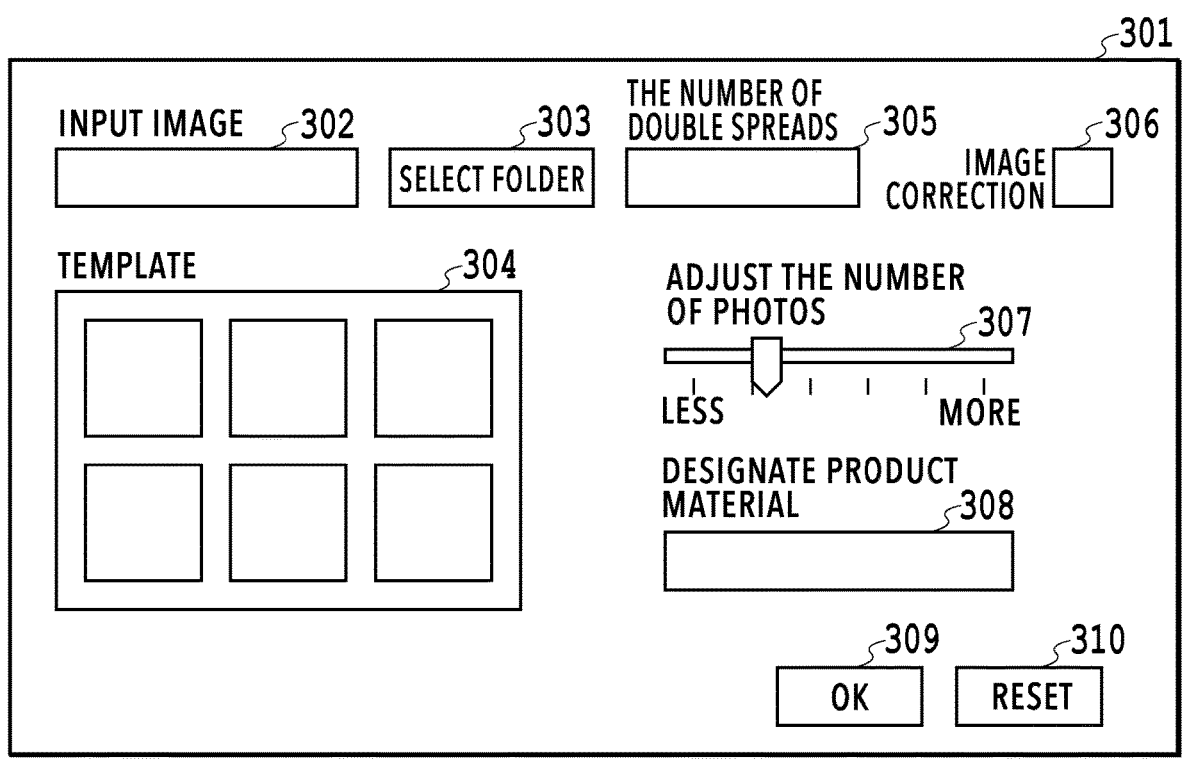
FIG. 3 is a diagram illustrating a display screen provided by the album creation application.

FIG. 3 is a diagram illustrating an example of the app activation screen 301 that is provided by the album creation application. The app activation screen 301 is displayed on the display device 105. The user sets the later-described album creation conditions via the app activation screen 301, and, through this UI screen, the album creation condition designation unit 201 obtains the setting contents that are set by the user.

In the path box 302 on the app activation screen 301, the storage location (path) of the multiple images (for example, multiple image files) to be the targets of album creation in the HDD 104 is displayed. If an instruction is given on the folder selection button 303 by a clicking operation with the pointing device 107 from the user, the folder selection screen that is installed as a standard in the OS will be displayed. On the folder selection screen, the folders that are set in the HDD 104 are displayed in a tree structure, so that the user can select a folder that includes the images to be the targets of album creation with the pointing device 107. The path of the folder, in which the album candidate image group selected by the user is stored, is displayed in the path box 302.

The template designation area 304 is an area for the user to designate template information, and the template information is displayed as an icon. In the template designation area 304, the icons of multiple template information are displayed side by side, so that the template information can be selected with clicking by the user using the pointing device 107.

The number-of-double-spreads box 305 accepts the setting of the number of double spreads in the album from the user. The user inputs a number directly into the number-of-double-spreads box 305 via the keyboard 106 or inputs a number from a list into the number-of-double-spreads box 305 with the pointing device 107.

The check box 306 accepts the user's designation of ON/OFF for image correction. The checked state is the state in which the image correction ON is designated, and the unchecked state is the state in which the image correction OFF is designated. Although all types of image correction are turned on or off with one button in the present embodiment, there is no limitation as such, and it is also possible that a check box is provided for each type of image correction.

The number-of-photos adjustment 307 is for adjusting the number of images to be arranged in a double spread of the album with a slider bar. The user can adjust the number of images to be arranged in each double spread of the album by moving the slider bar to the left or right. The number-of-photos adjustment 307 is set to an appropriate number, such as −5 for a small number and +5 for a large number, so that the number of images that can be arranged in a double spread can be adjusted.

The product material designation unit 308 is for setting the product material for the album to be created. As for the product material, it is possible to set the size of the album and the type of printing paper for the album. The type of printing paper and the type of the binding part may be individually set.

If the OK button 309 is pressed by the user, the album creation condition designation unit 201 outputs the contents that are set on the app activation screen 301 to the automatic layout processing unit 218 of the album creation application.

In that case, the path that is input in the path box 302 is transmitted to the image obtainment unit 203. The number of double spreads that is input in the number-of-double-spreads box 305 is transmitted to the number-of-double-spreads input unit 209. The template information that is selected in the template designation area 304 is transmitted to the template input unit 213. The ON/OFF of image correction in the check box for image correction is transmitted to the image correction condition input unit 216.

The reset button 310 on the display screen 301 is a button for resetting each of the setting information on the app activation screen 301.

Figure 4:
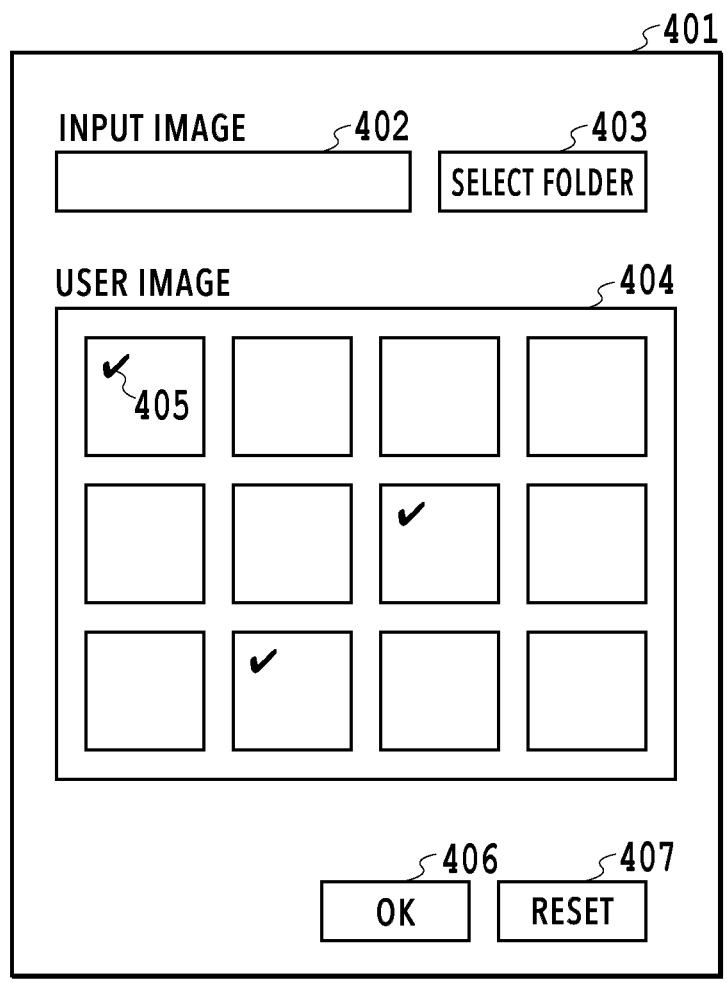
FIG. 4 is a diagram illustrating a display screen provided by the album creation application.

FIG. 4 is a diagram illustrating an example of the user image selection screen 401 provided by the album creation application. If the OK button 309 on the app activation screen 301 is pressed, the screen displayed on the display device 105 transitions to the user image selection screen 401. The user sets the user images via the user image selection screen 401, and the user image designation unit 202 obtains the contents that are set by the user. The user images are images that configure a user image group.

In the path box 402 on the user image selection screen 401, the storage location (path) of the multiple images (for example, multiple image files) to be the targets of user images in the HDD 104 is displayed. If an instruction is given on the folder selection button 403 by a clicking operation with the pointing device 107 from the user, the folder selection screen will be displayed. On the folder selection screen, the folders that are set in the HDD 104 are displayed in a tree structure, so that the user can select a folder that includes the images to be the targets of album creation with the pointing device 107. The folder path of the folder selected by the user is displayed in the path box 402. The same folder path as in the path box 302 may be displayed in the path box 402.

The user image designation area 404 is an area for the user to designate the user image, and multiple image files stored in the folder of the HDD 104 designated in the path box 402 are displayed as icons. In the user image designation area 404, the icons of multiple images are displayed side by side so as to be selectable with clicking by the user using the pointing device 107. In FIG. 4, it is indicated that the images marked with the check mark 405 are the images designated by the user. If selected by the user, the check mark 405 is added, and, if selected again in that state, the check mark 405 disappears.

If the OK button 406 is pressed by the user, the user image designation unit 202 obtains the contents that are set on the user image selection screen 401. The user image designation unit 202 outputs the obtained setting contents to the automatic layout processing unit 218 of the album creation application. At that time, the list of image files with the check mark 405 is transmitted to the image obtainment unit 203 as information of the user image group.

The reset button 407 on the user image selection screen 401 is a button for resetting each setting information on the user image selection screen 401.

<Processing Flow>

Figure 5:
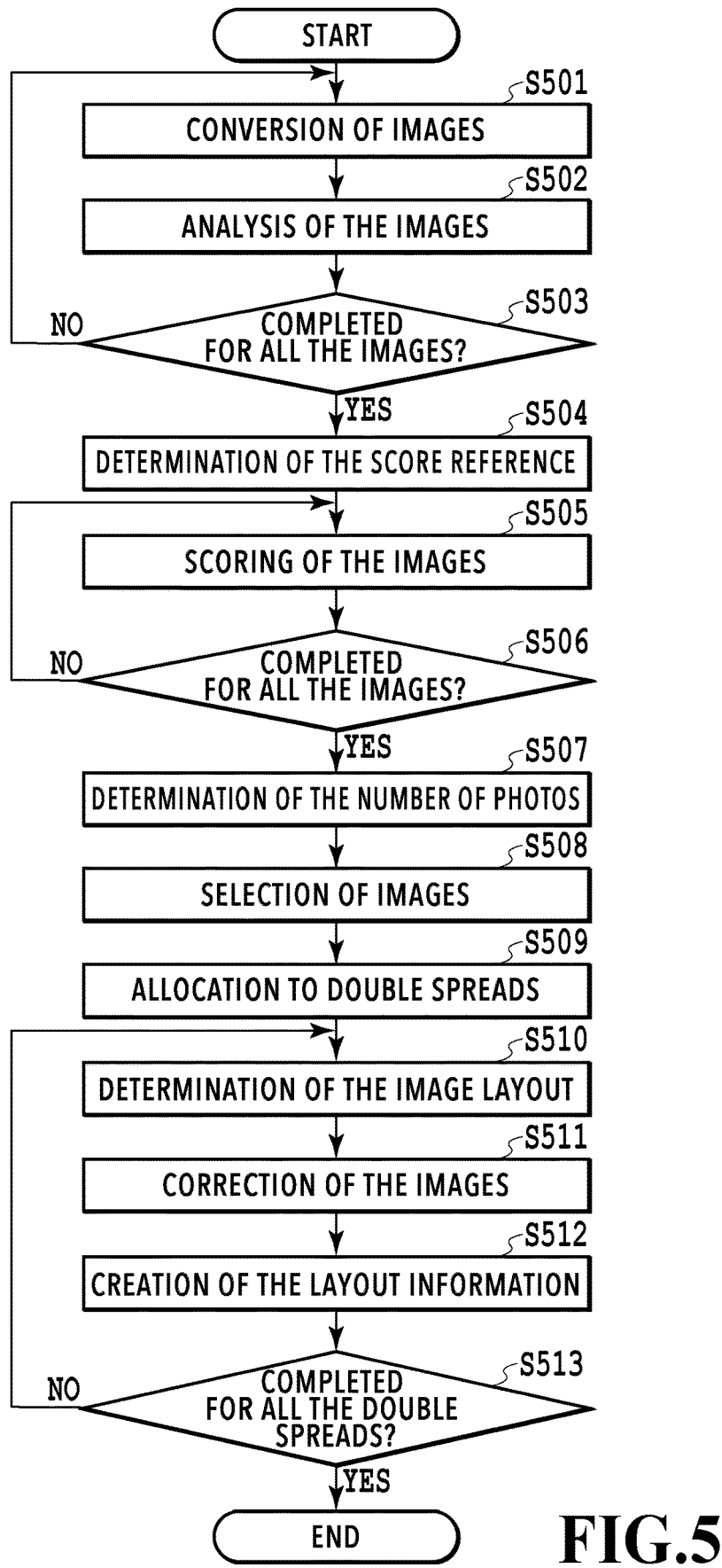
FIG. 5 is a flowchart illustrating an automatic layout processing.

FIG. 5 is a flowchart illustrating the processing performed by the automatic layout processing unit 218 of the album creation application. For example, the flowchart illustrated in FIG. 5 is implemented by the CPU 101 reading out a program stored in the HDD 104 into the RAM 103 and executing the program. The explanation of FIG. 5 is given on the premise that the processing is performed by the respective constituent elements illustrated in FIG. 2, whose functions are achieved by the CPU 101 executing the above-described album creation application. With reference to FIG. 5, the automatic layout processing will be explained. The symbol "S" in the explanation of each process means that it is a step in the flowchart (the same applies hereafter to the present specification).

In S501, the image conversion unit 204 converts images to generate analysis images. At the point in time of S501, it is assumed that various kinds of settings have been completed through the UI screens, i.e., the app activation screen 301 and the user image selection screen 401. That is, it is assumed that the settings have been completed for the album creation condition, the album candidate image group, and the user image group. Specifically, in S501, the image conversion unit 204 specifies multiples image files stored in the folders of the HDD 104 that are designated by the album creation condition designation unit 201 and the user image designation unit 202. Further, the specified multiple image files are read out from the HDD 104 to the RAM 103. Then, the image conversion unit 204 converts the images of the read-out image files into analysis images, which have a predetermined pixel count and color information as described above. In the present embodiment, the conversion is performed to obtain analysis images of which the short side is 420 pixels and the color information is converted into sRGB.

In S502, the image analysis unit 205 executes the analysis process of the analysis images generated in S501 to obtain the feature amounts. Examples of the feature amounts include meta information that is stored in the images and the image feature amounts that can be obtained by analyzing the images. In the present embodiment, although obtainment of the degree of focus, face detection, personal recognition, and object determination are executed as the analysis process, there is no limitation as such, and it is also possible to execute other analysis processes. Hereafter, details of the processing performed by the image analysis unit 205 in S502 will be explained.

The image analysis unit 205 extracts necessary meta information from the meta information received from the image obtainment unit 203. For example, from the Exif information attached to an image file that is read out from the HDD 104, the image analysis unit 205 obtains the shooting date and time as the time information of the image in the image file. As the meta information, for example, the position information of the image, the F value, etc., may be obtained. Further, as the meta information, information other than the information attached to the image file may be obtained. For example, schedule information associated with the shooting date and time of an image may be obtained.

Further, the image analysis unit 205 obtains image feature amounts from the analysis images generated in S501. Examples of the image feature amounts include the degree of focus. Detection of edges is performed as a method of obtaining the degree of focus. A Sobel filter is generally known as a method of detecting edges. Edge detection is performed with a Sobel filter, and the gradient of an edge is calculated by dividing the luminance difference between the start point and end point of the edge by the distance between the start point and end point. Based on the calculation result of the average gradient of the edges in an image, an image whose average gradient is large can be regarded as being in better focus than an image whose average gradient is small. Further, if multiple threshold values having different values are set for the gradient, it is possible to output an evaluation value of the in-focus degree by determining the threshold values that the gradient exceeds. In the present embodiment, two different threshold values are set in advance, so that the in-focus degree is determined in three stages, i.e., "DESIRABLE", "ACCEPTABLE", and "UNACCEPTABLE". For example, a focus gradient desired to be adopted for the album is determined as "DESIRABLE", an acceptable focus gradient is determined as "ACCEPTABLE", an unacceptable gradient is determined as "UNACCEPTABLE", and the respective threshold values are set in advance. For example, the setting of the threshold values may be provided by the creator of the album creation application, or the like, and it is also possible that the setting can be performed on a user interface. For example, as the image feature amounts, it is possible to obtain the brightness, tint, saturation, resolution, or the like, of an image.

The image analysis unit 205 executes face detection on the analysis images generated in S501. Here, a publicly-known method can be used for the face detection process. For example, AdaBoost, which creates a strong discriminator from multiple weak discriminators that are prepared, is used for the face detection process. In the present embodiment, the face image of a person (object) is detected by use of a strong discriminator created by AdaBoost. The image analysis unit 205 extracts a face image and obtains the upper left coordinate values and lower right coordinate values of the position of the detected face image. With these two kinds of coordinates, it is possible for the image analysis unit 205 to obtain the position of the face image and the size of the face image. Although the case in which an object is detected by use of AdaBoost has been explained here, it is also possible to perform the object detection by use of a trained model such as a neural network.

The image analysis unit 205 compares a face image, which is detected by the face detection in a processing-target image based on an analysis image, with the representative face images, which are saved for the respective individual IDs in the face dictionary database, so as to thereby perform personal recognition. Regarding the multiple representative face images, the image analysis unit 205 respectively obtains their similarities to the face image in the processing-target image. Further, the representative face image having the highest similarity is specified if the similarity is equal to or greater than a threshold value. Then, the individual ID corresponding to the specified representative face image is set as the ID of the face image in the processing-target image. Regarding the above-described multiple representative face images, in a case when their similarities to the face image of the processing-target image are all lower than the threshold value, the image analysis unit 205 sets the face image of the processing-target image as a new representative face image and registers the new representative face image in the face dictionary database in association with a new individual ID.

The image analysis unit 205 executes object recognition on the analysis images generated in S501. Here, a publicly-known method can be used for the object recognition process. In the present embodiment, objects are recognized by a determiner (trained model) created by Deep Learning. The determiner outputs a likelihood of zero to one for each object, and objects exceeding a given threshold value are recognized to be in the image. By recognizing an object image, the image analysis unit 205 can obtain the type of object, such as a pet including a dog, a cat, or the like, a flower, food, a building, a figurine, and a landmark. Although objects are determined in the present embodiment, there is no limitation as such, and it is also possible to recognize a facial expression, a shooting composition, a scene, such as a trip or a wedding ceremony, etc., so as to obtain the respective type. Further, it is also possible to utilize the likelihood itself that is output from the determiner before the determination is executed. In this way, the score reference determination unit 206 can determine the score reference with a greater degree of freedom.

FIG. 6 is a diagram illustrating feature amounts. As illustrated in FIG. 6, the image analysis unit 205 sorts the feature amounts obtained in S502 for each ID that identifies the respective image (analysis image) and stores the feature amounts in a storage area such as the ROM 102. For example, as illustrated in FIG. 6, the shooting date and time information, the focus determination result, the number of detected face images, as well as the position information and similarity thereof, and the type of the recognized object, which are obtained in S502, are stored in a table format. The position information of the face images is stored for each individual ID obtained in S502. Further, in a case when multiple objects are recognized from one image, all of the multiple types of the objects are stored in the line corresponding to the one image in the table illustrated in FIG. 6.

In S503, the image analysis unit 205 determines whether or not the processes of S501 to S502 have been completed for all the images included in the album candidate image group and the user selection image group. Here, if it is determined that the processes have not been completed, the processes from S501 will be repeated. If it is determined that the processes have been completed, the processing will proceed to S504. That is, by repeatedly executing the processes of S501 to S502 for all the images stored in the designated folder, the table illustrated in FIG. 6, which contains the respective information of all the images, is created.

In S504, the score reference determination unit 206 determines the score reference, based on the feature amounts obtained from the analysis results of the user images of the user image group. That is, the score reference to be used by the image scoring unit 207 is determined, based on the feature amounts corresponding to the image IDs of the user image group. The herein-mentioned score is an index indicative of the appropriateness for layout of each image. Further, the score reference is a reference for calculating a score in the image scoring unit 207 and is, for example, a formula or a score calculation algorithm that is configured with given coefficients. The score reference determination unit 206 generates control information to be used for the score reference, then determines the score reference based on the control information, and then provides the score reference to the image scoring unit 207. As a specific example, the control information is the average value and the standard deviation for each feature amount, as will be described later.

Figure 8:
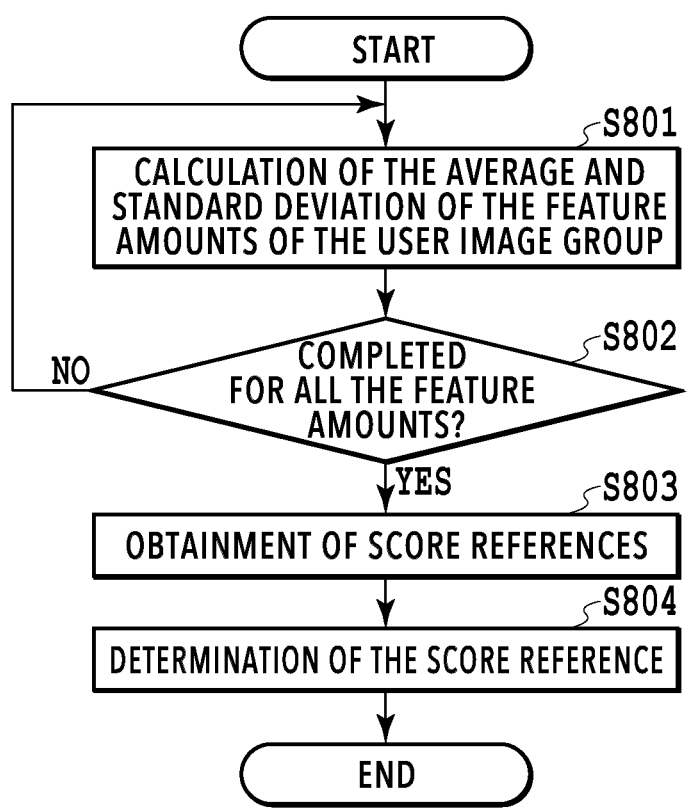
FIG. 8 is a flowchart illustrating the processing of a score reference determination flow.

FIG. 7A through FIG. 7C are diagrams illustrating feature amounts in a feature amount space. FIG. 8 is a flowchart illustrating the details of the score reference determination process of S504. Hereafter, the score reference determination process performed in S504 will be explained with reference to FIG. 7A through FIG. 7C and FIG. 8.

In S801, the score reference determination unit 206 calculates the average value and standard deviation of the user image group as control information for each feature amount. Hereafter, the control information will be explained with reference to FIG. 7A through FIG. 7C.

In FIG. 7A, the example in which the feature amount of each image is plotted on the feature amount space is illustrated. Since the feature amount space is multi-dimensional and it is not possible to illustrate all the feature amounts, the explanation will be given in FIG. 7A with the two extracted feature amounts, i.e., the similarity to the individual ID1 and the shooting time extracted from each feature amount. However, one-dimensional feature space using one feature amount is also possible. Further, the same processing is performed for other feature amounts. The shaded points, such as the point 701, are indicative of the points where a feature amount corresponding to a user image is plotted. The unshaded points, such as the point 702, are indicative of the points where a feature amount corresponding to an album candidate image is plotted. The point 703 indicated by "x" in the drawing is indicative of the average value vector, which is obtained from the feature amount vectors of the user image group.

In FIG. 7B, each image is plotted on the feature amount axis of similarity to the individual ID1. If the face of the individual ID1 is included in the image and the correlation to the person who is identified with the individual ID is higher, that is, if the probability of being the same person as the individual ID is higher, a larger value (in the right direction of the axis) is given. The point 704 is indicative of the average value of the user image group on this feature amount axis, and the width 705 is indicative of the standard deviation of the user image group on this feature amount axis. Since the respective user images have resembling features on the feature amount axis of similarity to the individual ID1 illustrated in FIG. 7B, the standard deviation 705 is small and the distribution is dense. That is, it can be seen that there is a high probability that the person of the individual ID1 is often included in all the images of the user image group.

In FIG. 7C, each image is plotted on the feature amount axis of shooting date and time. The point 706 is indicative of the average value of the user image group on this feature amount axis, and the width 707 is indicative of the standard deviation of the user image group on this feature amount axis. Since the respective user images have different features on the feature amount axis of the shooting date and time, the standard deviation 707 is large and the distribution is sparse. That is, it can be seen that the user image group includes images of various shooting dates and times.

In S802, the score reference determination unit 206 determines whether or not the process of S801 has been completed for all the feature amount items. Here, if it is determined that the process has not been completed, the processes from S801 will be repeated. If it is determined that the process has been completed, the processing will proceed to S803.

In S803, the score reference determination unit 206 obtains the score references that are incorporated in the album creation application in advance. Then, in S804, the score reference is determined by use of the control information (in the present example, the average value and the standard deviation for each feature amount), which is calculated in S801. More specifically, in the present embodiment, the below-explained formula (1) and formula (2) are obtained as the score references, and the score reference is determined by applying the control information (the average value and standard deviation for each feature amount), which is calculated in S801, to the formula (1). Thereafter, the processing proceeds to S505, so that the image scoring unit 207 performs the process of scoring the images of the album candidate image group. Hereafter, the examples of the score reference that is determined in S504 and the scoring process of S505 that follows will be explained together. In the present embodiment, in S505, the image scoring unit 207 first calculates the score for each image to be the target of scoring (referred to as the "attention image"), as well as for each feature amount by use of the formula (1) using the control information, which is calculated in S801. The image to be the target of scoring is an image of the album candidate image group.

$$Sji = (50 - 10 \times |\mu i - fji|/\sigma i)/\sigma i \qquad (1)$$

Here, j is indicative of the index of the attention image, i is indicative of the index of the feature amount, fji is indicative of the feature amount of the attention image, Sji is indicative of the score corresponding to the feature amount fji, and μi and σi are respectively indicative of the average value and standard deviation of each feature amount of the user image group. That is, as for such feature amounts of which the standard deviation 705 of the user image group is small and the distribution is dense as in FIG. 7B, the feature amounts of the attention images that are close to the average value are scored higher than the feature amounts that are far from the average value. On the other hand, as for such feature amounts of which the standard deviation 707 of the user image group is large and the distribution is sparse as in FIG. 7C, there is not much difference among the scores of the feature amounts of the attention images that are close to the average value and the feature amounts that are far from the average value, relatively, compared with the case of FIG. 7B.

Then, in S505, the image scoring unit 207 calculates the score of each attention image by use of the score Sji for each attention image as well as for each feature amount, which is obtained by the formula (1), and the formula (2).

$$Pj = \sum i(Sji)/Ni \qquad (2)$$

Here, Pj is indicative of the score of each attention image, and Ni is indicative of the number of items of the feature amounts. That is, the score of each attention image is calculated as the average of the scores of the respective feature amounts. In this way, in S804, the score reference determination unit 206 determines the formula (1) and the formula (2) as the score references. Thereafter, in S505, the image scoring unit 207 scores each attention image by application of formula (1) and formula (2) as described above.

Here, since it is preferable that the images used for the album are in focus, it is also possible to add a predetermined score to the attention images whose feature amount of focus illustrated in FIG. 6 is "DESIRABLE". Further, it is also possible to add a predetermined score to the attention images having a certain object. For example, in a case when many images, including animals, are desired to be selected, it is possible to perform such a control in which a predetermined score is added to the attention images, including an object belonging to animals so that the attention images will be preferentially selected.

According to the score references above, as for a feature amount of which the standard deviation σ is small, such as the similarity to the individual ID1 in FIG. 7B, the score to be calculated by the formula (1) becomes higher for the attention images having features resembling the user image group more. Therefore, as for the similarity to the individual ID1, which is a feature amount whose distribution is dense in the user image group, the attention images having features resembling the user image group are scored higher so as to be more likely to be selected.

On the other hand, as for a feature amount of which the standard deviation σ is large, such as the shooting date and time in FIG. 7B, the score to be calculated by the formula (1) is small regardless of the difference between the average value and the feature amount fji of the attention image. Therefore, regarding the shooting date and time, which is a feature amount that is sparsely distributed in the user image group, the effect on the image selection is small regardless of the features of the attention images.

In this way, by use of the score references of the present embodiment, images having features common to the user image group are selected from the album candidate image group, so that images with a unified impression can be selected as the layout image group.

Although the formula (2) is used as a score reference for calculating the score of each attention image in the present embodiment, there is no limitation as such, and, for example, it is also possible that weight addition with the formula (3) is performed on the score of each feature amount calculated by the formula (1).

$$Pj = \sum (wi \times Sji)/Ni \qquad (3)$$

Here, wi is a weight coefficient for each feature amount. Accordingly, it is possible to change the degree of effect (contribution ratio) that each feature amount has on the score of the attention image. For example, in FIG. 7A through FIG. 7C, by increasing the contribution ratio for the similarity to the individual ID1 and decreasing the weight contribution ratio for the shooting date and time, it is possible to perform scoring with a greater emphasis on the similarity to the individual ID1.

Further, it is also possible to use such a score reference to set the largest score as the score of the attention image, from among the scores of the respective feature amounts that are calculated by the formula (1). Accordingly, a high score can be given in a case when, of the respective feature amounts, one or more feature amounts have features resembling the user image group. For example, in FIG. 7A through FIG. 7C, it is possible to give a high score to the attention image even in a case when the feature amounts other than the similarity of the attention image to the individual ID1 have different features from the user image group, such as the shooting date and time.

Further, it is also possible to use such a score reference to calculate the score of the attention image, based on the difference between the average vector of the user image group and the vector of the attention image in a multi-dimensional feature amount space. Accordingly, it is possible to perform scoring in comprehensive view of all the feature amounts. For example, in FIG. 7A, since the album candidate image 702 has a feature resembling the average value vector 703 in the multi-dimensional space, a high score will be given to the album candidate image 702. On the other hand, since the album candidate image 708 has a feature different from the average value vector 703 in the multi-dimensional space, a high score is not given to the album candidate image 708. That is, it is possible to perform such control, in which a high score is not given, in a case when one or more feature amounts have features different from the average value vector 703 of the user image group.

Although the score reference is determined by use of the average and the standard deviation of each feature amount of the user image group in the present embodiment, there is no limitation as such, and, for example, it is also possible to determine a score reference that uses each feature amount of the user image group and the standard deviation thereof as in the formula (4).

$$Sji = \sum k(50 - 10 \times |fki - fji| / \sigma i) / (\sigma i \times Nk) \quad (4)$$

Here, k is indicative of the index of a user image, fki is indicative of the feature amount of the user image, and Nk is indicative of the number of images included in the user image group. In this way, by comparing the feature amount of the attention image with the feature amount of each user image, the difference between the feature amounts of the attention image and the user image group can be evaluated more accurately.

Although the average value and the standard deviation of the feature amounts of the user image group are used as the control information in the present embodiment, there is no limitation as such, and it is also possible to use the median value of the feature amount, the distribution shape (normal distribution, Poisson distribution, etc.), the interquartile range, the interquartile deviation, or the like. For example, the median value and the standard deviation of the feature amounts of the user image group may be used, or the average value and the interquartile deviation of the feature amounts of the user image group may be used. That is, at least one of the average value and the median value of the feature amounts of the user image group and at least one of the standard deviation, the interquartile deviation, and the distribution shape may be used.

Referring to FIG. 5 again, in S505, which follows S504, the image scoring unit 207 obtains the score references that are determined by the score reference determination unit 206. That is, as described above, the formulas illustrated in the formulas (1) to (4) are obtained as the score references. Further, the image scoring unit 207 executes scoring on each image of the album candidate image group, based on the obtained score references. Scoring is to give a score for each image. The given scores are provided to the image selection unit 211 and are referred to at the time of selecting images to be used in the layout, which will be described later.

In S506, the image scoring unit 207 determines whether or not the scoring of S505 has been completed for all the images of the album candidate image group in the folder designated by the user. If it is determined that the scoring has not been completed, the processes from S505 will be repeated. If it is determined that the scoring has been completed, the processing proceeds to S507.

In S507, the number-of-photos determination unit 210 determines the number of photos to be arranged in the album. In the present embodiment, the number of photos to be arranged in the album is determined by the formula (5) by use of the adjustment amount for adjusting the number of double spreads, which is input by the number-of-photos adjustment amount input unit 208, and the number of double spreads, which is input by the number-of-double-spreads input unit 209.

$$\text{Number of photos} = [\text{Number of double spreads} \times \quad (5)$$
$$(\text{Basic number of photos} + \text{Adjustment amount})]$$

Here, [·] is indicative of a floor function that truncates the decimal part, and the basic number of photos is indicative of the number of images to be arranged in a double spread in a case when adjustment is not performed. In the present embodiment, the basic number of photos is set to six in consideration of the appearance at the time of layout and is incorporated in the program of the album creation application in advance.

Further, although the number of photos to be laid out is determined based on the number of double spreads and the number-of-photos adjustment amount in the present embodiment, there is no limitation as such, and it is also possible that the number of photos to be laid out is determined according to the number of user images designated by the user image designation unit 202. For example, it is also possible to perform such control in which the number of photos to be laid out is set to a larger number as an increase in the number of user images.

In S508, the image selection unit 211 selects the images to be laid out, based on the scores of the respective images, which are calculated by the image scoring unit 207, and the number of photos, which is determined by the number-of-photos determination unit 210. Hereafter, the selected image group is referred to as a layout image group.

In the present embodiment, the user image group is selected as the image group of which the images will all be laid out. Then, the image selection unit 211 selects images from the image group designated by the album creation condition designation unit 201 in the descending order of the scores, which are given by the image scoring unit 207, for the number obtained by subtracting the number of images of the user image group from the total number of images to be laid out.

By executing the above-described method in the score reference determination unit 206 and the image scoring unit 207, images having features resembling the user image group will be selected in the selection of the image selection unit 211.

Figure 9A:
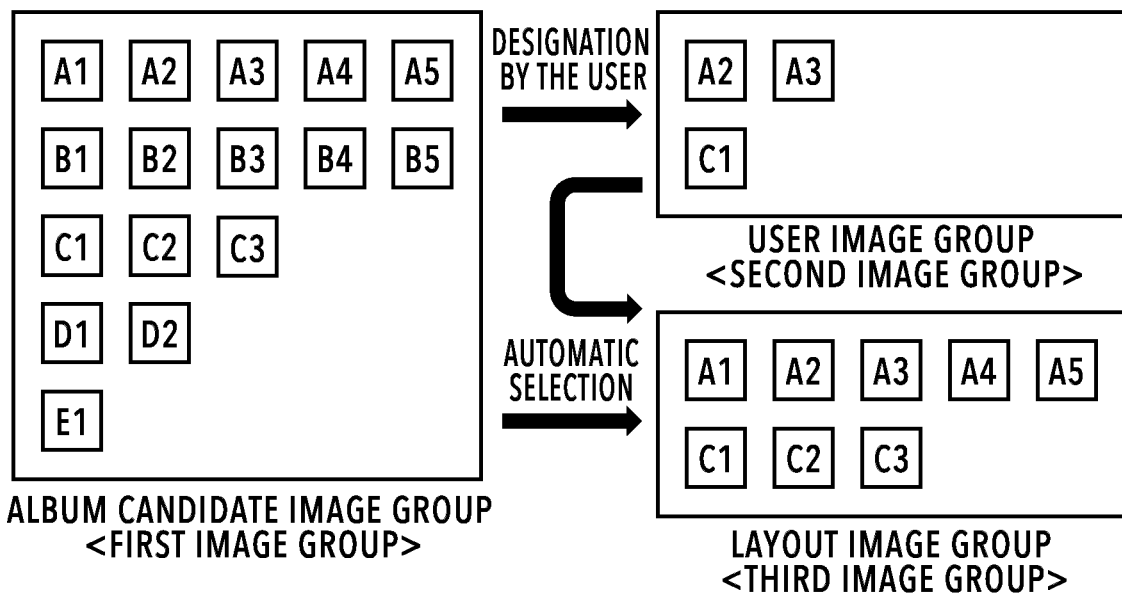
FIG. 9A and FIG. 9B are diagrams illustrating an example of the result of image selection.
Figure 9B:
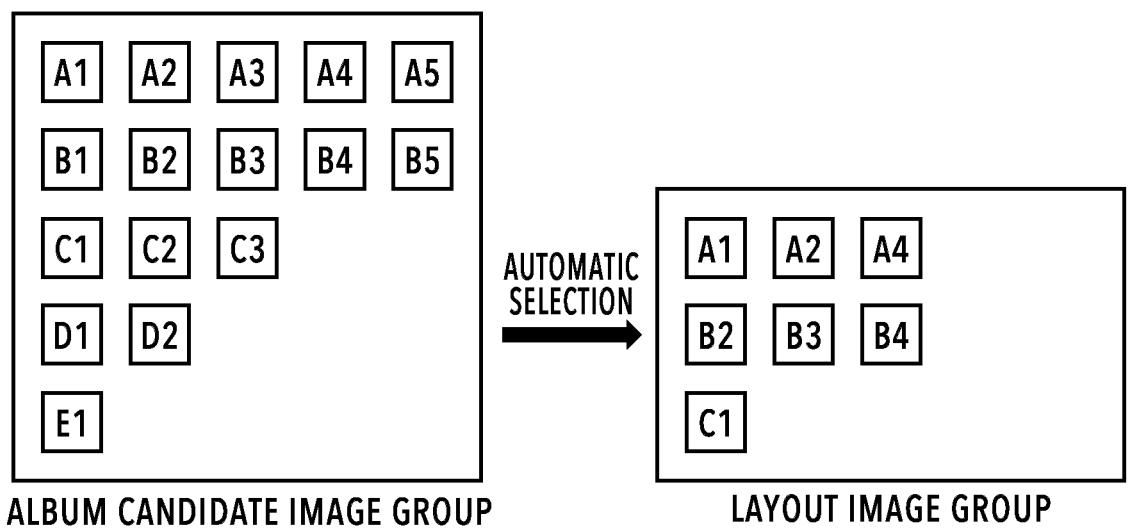

FIG. 9A and FIG. 9B are diagrams illustrating an example of an image selection result. In FIG. 9A, an example of the image selection result in the present embodiment is illustrated. In FIG. 9B, as a comparative example, an example of the image selection result in a case when the present embodiment is not used is illustrated. First, the explanation will be given with reference to FIG. 9A. For the sake of explanation, in each image, the feature amount with the highest score is noted for the different feature amounts A through E. In FIG. 9A, for the album candidate image group having different features from A to E, the user image designation unit 202 designates the images having the features A and C as the user image group. Then, the image selection unit 211 selects images having the features A and C as the layout image group. In this way, the user's intention can be grasped from the user image group and reflected in the image selection. On the other hand, an example of the image selection result, in a case when a user selection image does not exist, is illustrated in FIG. 9B. In this case, since the images are selected based on the tendency of the feature amounts of the entire album candidate image group, a large number of images having the feature A or the feature B, which are included in a large number of images, will be selected as a result. Further, in the case of FIG. 9B, even if there is an image designated by the user as in FIG. 9A, in a case when images are automatically selected from the album candidate image group, the images will be selected based on the tendency of the feature amounts of the entire album candidate image group after all. Therefore, a large number of images having the feature A or the feature B, which are included in a large number of images, will be selected as a result.

As a method of image selection, the selection may be performed with a probability such that a higher selection probability is set for a higher score. By performing the selection with probability in this way, it is possible to change the layout images each time the automatic layout function is executed by the automatic layout processing unit 218. For example, in a case when the user is not satisfied with an automatic layout result, it is possible for the user to obtain a layout result different from the previous one by pressing a re-selection button, although the UI is not illustrated in the drawings.

Further, it is also possible that the image selection unit 211 does not select any layout image from the user image group, so that images corresponding to the total number of images to be laid out will be selected from the image group that is designated by the album creation condition designation unit 201. According to this method, since the user image designation unit 202 designates an image that is not desired to be included in the album, but has an ideal composition or arrangement of the subjects, it is possible to search for and to select images resembling the ideal.

Further, it is also possible that images corresponding to the total number of images to be laid out are selected from the image group combining the image data group designated by the album creation condition designation unit 201 and the user images. According to this method, there is a possibility that images that are more suitable for the layout than the images in the user image group will be searched and selected. In this case, the image scoring unit 207 scores not only the album candidate image group, but also, the user image group.

Further, in a case when the image selection unit 211 selects images whose scores calculated by the image scoring unit 207 are equal to or larger than a given threshold value as the layout image, the number-of-photos determination unit 210 need not determine the number of photos. In this case, such a value with which the number of selected images will be the same as the number of double spreads is the upper limit of the threshold value that can be set.

Returning to FIG. 5, the explanation will be continued. For the allocation in S509, the double spread allocation unit 212 divides the layout image group obtained in S508 to the image groups corresponding to the number of double spreads, which is input by the number-of-double-spreads input unit 209. In the present embodiment, the layout images are aligned in the order of the shooting times obtained in S502 and divided at a section where the time difference of the shooting times of adjacent images is large. Such processing is performed until the division is done for the number of double spreads that is input from the number-of-double-spreads input unit 209. That is, the division is performed "(Number of double spreads−1)" times. Accordingly, it is possible to create an album in which images are arranged in the order of the shooting dates and times. It is also possible that the process of S509 is performed on a per page basis, not on a per double spread basis.

In S510, the image layout unit 214 determines the image layout. Hereafter, the example in which the template input unit 213 inputs FIG. 10A through FIG. 10P to given double spreads according to the designated template information will be explained.

Figure 10A:
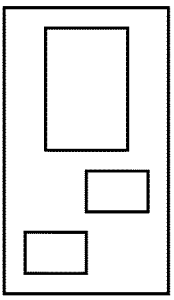
FIG. 10A through FIG. 10Q are diagrams illustrating a template group to be used for layout of image data.
Figure 10B:
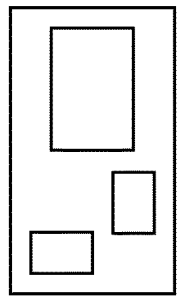
Figure 10C:
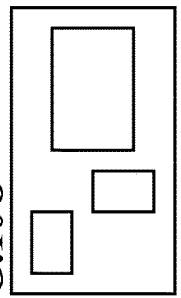
Figure 10D:
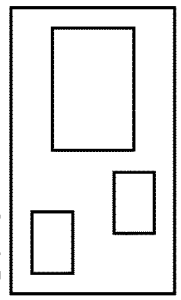
Figure 10E:
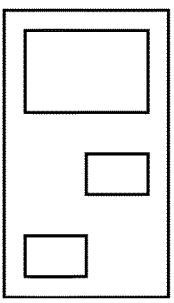
Figure 10F:
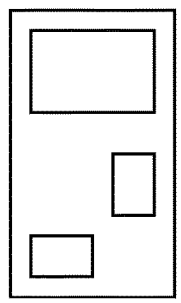
Figure 10G:
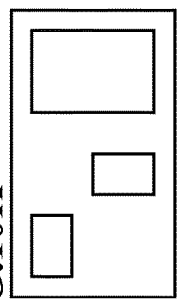
Figure 10H:
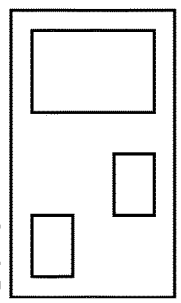
Figure 10I:
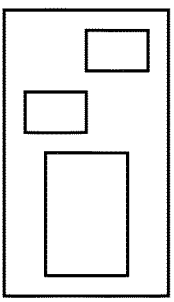

FIG. 10A through FIG. 10Q are diagrams illustrating a template group to be used for layout of image data. The multiple templates included in the template group correspond to the respective double spreads. The template 1001 is one template. The template 1001 includes the main-slot 1002, the sub-slot 1003, and the sub-slot 1004. The main-slot 1002 is a main slot (frame for laying out an image) in the template 1001 and is larger in size than the sub-slot 1003 and the sub-slot 1004.

Here, the number of slots of the input template is designated as three as an example. It is assumed that, if the three selected images are arranged in the portrait direction or the landscape direction according to the shooting dates and times, the orientations thereof are as illustrated in FIG. 10Q.

Here, in each image group allocated to a double spread, the image whose score calculated, by the image scoring unit 207 is the highest, is set to the main-slot, and the other images are set to the sub-slots. Whether an image is for the main-slot or the sub-slots may be set based on a given feature amount obtained by the image analysis unit or may be set randomly. Further, the user selection images may be preferentially set to the main-slot.

Figure 10J:
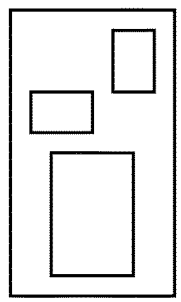
Figure 10K:
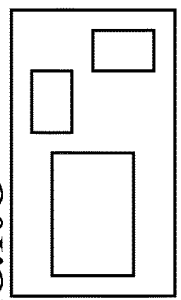
Figure 10L:
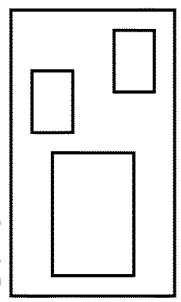
Figure 10M:
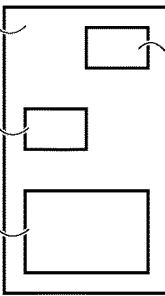
Figure 10N:
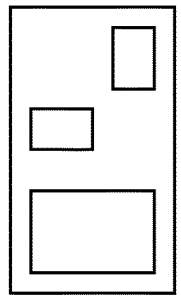
Figure 10O:
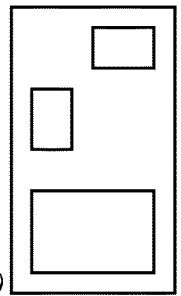
Figure 10P:
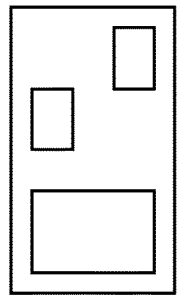

Here, it is assumed that the image data 1005 is for the main-slot and the image data 1006 and 1007 are for the sub-slots. In the present embodiment, image data with an earlier shooting date and time is laid out at the upper left of the template, and an image with a later shooting date and time is laid out at the lower right of the template. In FIG. 10Q, since the image data 1005 for the main-slot has the latest shooting date and time, the templates of FIG. 10I through FIG. 10L will be the candidates. Further, since the earlier one of the image data 1006 for a sub-slot is a portrait image and the later one of the image data 1007 is a landscape image, it will be determined as a result that the template of FIG. 10J is the most suitable for the selected three image data, so that the layout is determined. In S510, which images are laid out in which slots of which template, are determined.

In S511, the image correction unit 217 executes image correction. The image correction unit 217 executes image correction in a case when the information indicating that the image correction is ON is input from the image correction condition input unit 216. As the image correction, for example, dodging correction (luminance correction), red-eye correction, or contrast correction will be executed. The image correction unit 217 does not execute image correction in a case when the information indicating that the image correction is OFF is input from the image correction condition input unit 216. For example, the image correction can also be performed on image data whose size of the short side has been converted into 1200 pixels in the sRGB color space.

In S512, the layout information output unit 215 creates layout information. The image layout unit 214 lays out the image data, on which the image correction of S511 has been executed, to the respective slots of the template determined in S510. Here, the image layout unit 214 scales the image data to be laid out according to the size information of the slot and lays out the image data. Then, the layout information output unit 215 generates the bitmap data, in which the image data is laid out in the template, as the output image data.

In S513, the image layout unit 214 determines whether or not the processes of S510 to S512 have been completed for all the double spreads. If it is determined that the processes have not been completed, the processes from S510 will be repeated. If it is determined that the processes have been completed, the automatic layout processing of FIG. 5 will be completed.

If the automatic layout processing of FIG. 5 is completed, the layout information output unit 215 outputs the bitmap data (output image data), including the images laid out in the template, which is generated in S512, to the display device 105, so that the bitmap data is displayed. The generated image data may be uploaded to a server via the Internet, based on a user's instruction. Based on the uploaded image data, printing and bookbinding processes are executed to create an album (photobook) as a booklet, and the album will be delivered to the user.

The above is the explanation relating to the processing flow for carrying out the automatic layout processing. According to the present embodiment, it is possible to appropriately select images in line with the user's intention. In particular, in the present embodiment, by determining a score reference that gives a high score to an image having features resembling the user image group, it is possible to select images with a unified impression while grasping the user's intention. Further, according to the present embodiment, in a case when the overall tendency of the album candidate image group is different from the tendency of the user image group, images can be selected more in line with the user's intention, relatively, compared with a case in which images are selected according to the overall tendency of the album candidate image group.

Second Embodiment

In the second embodiment, regarding the score reference determination process of S504 that is explained in the first embodiment, an explanation will be given of the process of determining a score reference that is different from the score reference explained in the first embodiment. Specifically, a score reference that gives a high score to a feature amount that is sparsely distributed in the user image group. Further, regarding the feature amounts to be distributed as such, an explanation will be given of the example of using such a score reference that selects images having features resembling the user image group or, conversely, using such a score reference that does not select those images on purpose. Since the basic processing of the automatic layout processing is the same as the example explained in the first embodiment, the differences will be mainly explained below.

Figure 11A:
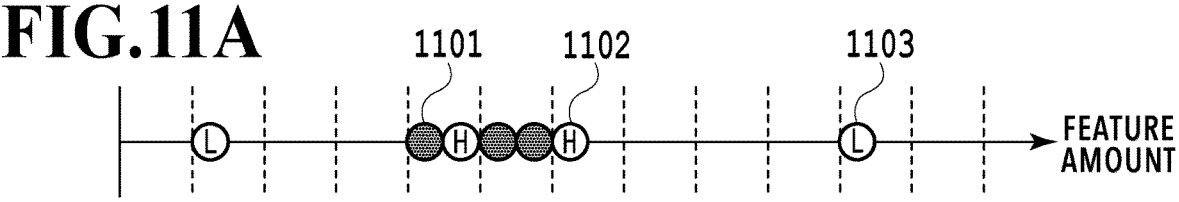
FIG. 11A through FIG. 11C are diagrams illustrating score references.
Figure 11B:
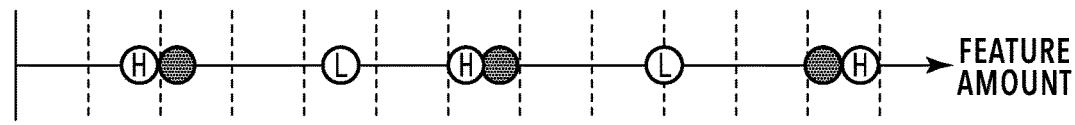
Figure 11C:
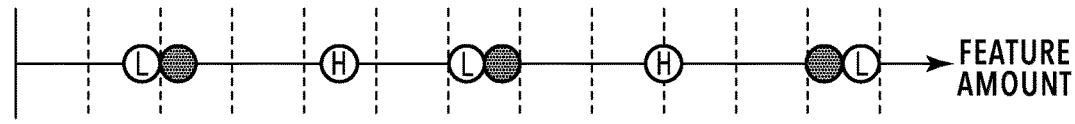

FIG. 11A through FIG. 11C are diagrams for explaining score references of the present embodiment. In FIG. 11A, a result of plotting each image of the first embodiment on a certain feature amount axis is illustrated. The shaded points, such as the point 1101, are indicative of user images. The unshaded points such as the point 1102 and point 1103 are indicative of album candidate images. Further, the letters "H" and "L" written inside the point 1102 and point 1103 are indicative of a degree of the score calculated by the image scoring unit 207. That is, "H" indicates that the degree of the score is high, and "L" indicates that the degree of score is low.

In the first embodiment, in S504, the score reference determination unit 206 uses the score references that give a greater effect on the scores of the feature amounts with which the user image group is plotted more densely (that is, the feature amounts with smaller standard deviation σ). As a result, as illustrated in FIG. 11A, regarding the feature amounts that are distributed densely in the user image group, images having features resembling the user image group more will be given with higher scores, so that the images are more likely to be selected.

In the present embodiment, in S504, a score reference that gives a greater effect on the scores of the feature amounts with which the user image group is plotted in a more scattered manner (that is, the feature amounts with larger standard deviation σ) will be used. For example, the score of each feature amount may be calculated for each attention image by the formula (6).

$$Sji = \sigma i \times (50 - 10 \times \text{MIN}k(|fki - fji|)/\sigma i)/Nk \quad (6)$$

Here, MINk (−) is a function for obtaining the minimum value of the element (−) in each user image k. That is, in the formula (6), the difference between the feature amounts of the attention image and the user image resembling the attention image the most is utilized for the score reference. Further, in the formula (6), as the standard deviation σi of the feature points i of the user image group is larger, a higher score will be calculated.

As a result, as illustrated in FIG. 11B, a higher score will be given to an image having a feature resembling a given user image more in a case when the user image group is plotted in a scattered manner. Therefore, regarding the feature amounts that are sparsely distributed in the user image group, it is possible to select images having features resembling the user image group.

Further, in S504, as illustrated in FIG. 11C, it is also possible to use a score reference that gives a higher score to images having feature amounts with which the user image group is plotted in a scattered manner and whose features differs more from the respective user images. For example, the score may be calculated by the formula (7).

$$Sji = \sigma i \times \sum (50 - 10 \times \sigma i / \text{MIN}k(|fki - fji|))/Nk \quad (7)$$

Accordingly, images having a feature different from the user image group are selected from the album candidate image group and combined with the user image group, so that it is possible to select a variation of images as the layout image group.

Further, in the present embodiment, it is also possible that the score reference determination unit 206 performs principal component analysis on the user image group, in order to obtain a mapping function to the first axis, and maps all the images onto the first axis, so as to use a score reference based on the difference between the feature amounts of a user image and the attention image on the first axis.

The above is the explanation relating to the details of processing of the score reference determination process in the present embodiment. According to the present embodiment, it is also possible to determine such a score reference that gives a high score to an image whose feature differs from the user image group, so as to enable selection of a wide variety of images in consideration of the user's intention.

Third Embodiment

In the third embodiment, an explanation will be given of the example in which the score reference determination process of S504 is different from those of the first embodiment and the second embodiment. Specifically, an explanation will be given of the example of performing such a process, in which the score reference explained in the first embodiment and the score reference explained in the second embodiment, are automatically switched.

In the first embodiment and the second embodiment, as illustrated in FIG. 11A through FIG. 11C, the explanations have been given of the examples, in which the distribution of the user image group in the feature amount space and the difference between the feature amounts of a user image and the attention image, are utilized for the score references.

In the first embodiment, the explanation has been given of the example of using such a score reference with which the feature amounts that cause the user image group to be densely arranged give a great effect on the calculation of scores, so as to enable selection of images with a unified impression.

In the second embodiment, the explanation has been given of the example of using such a score reference with which the feature amounts that cause the user image group to be arranged in a scattered manner give a great effect on the calculation of scores, so as to enable selection of a wide variety of images.

In the third embodiment, the score references explained in the first embodiment and the second embodiment are automatically switched and utilized based on the tendency of the feature amounts in the feature amount space.

Figure 12:
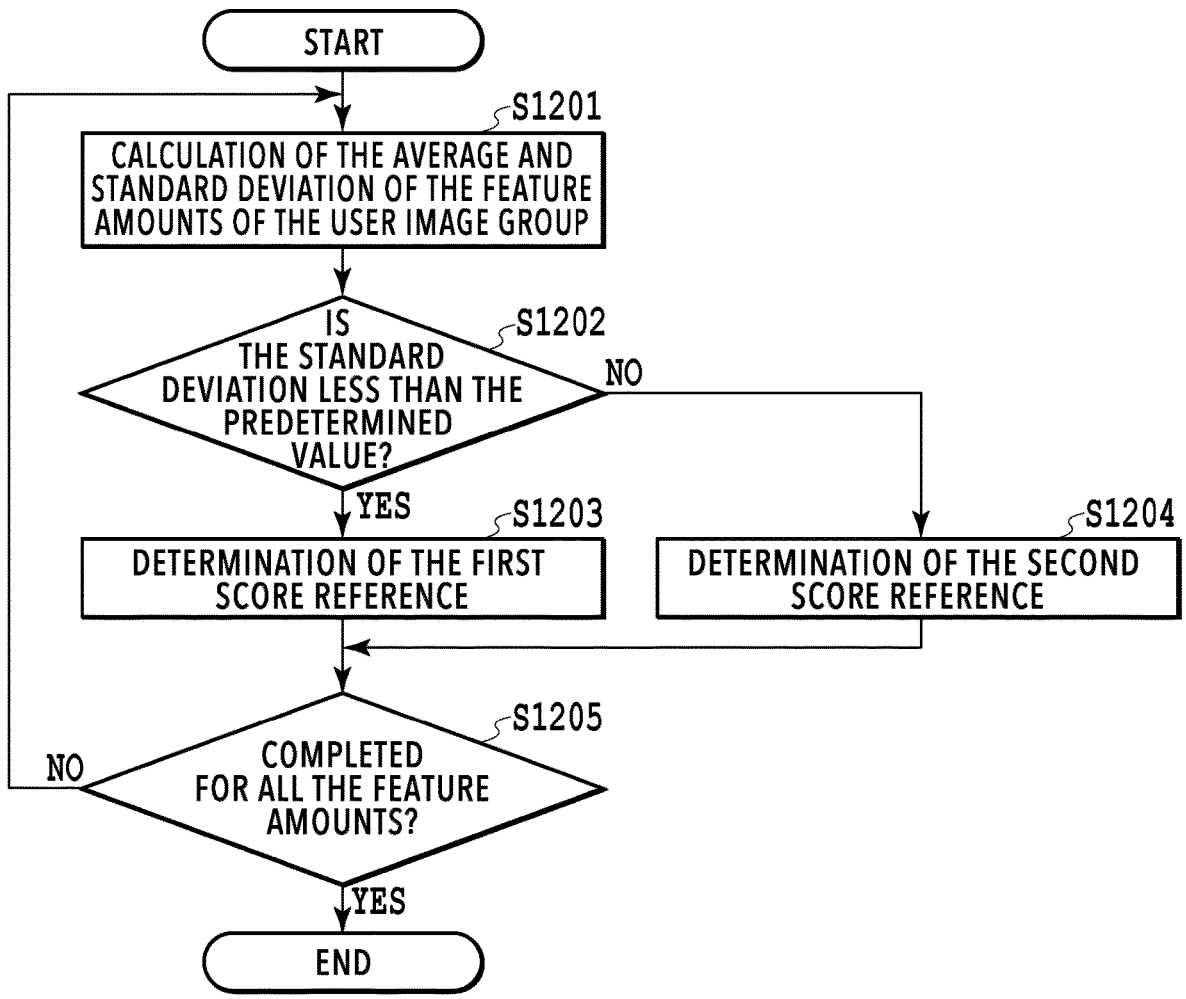
FIG. 12 is a flowchart illustrating the processing of a score reference determination flow.

FIG. 12 is a flowchart illustrating the details of the score reference determination process of S504 in the present embodiment. In the present embodiment, according to the flow illustrated in FIG. 12, the score reference determination unit 206 automatically switches the score references, based on the value of the standard deviation obtained for each feature amount.

In S1201, as with the first embodiment, for each feature amount, the average and the standard deviation of the feature amounts of the user image group are calculated.

In S1202, the score reference to be obtained is switched based on the value of the standard deviation calculated in S1201. That is, in S1202, the score reference determination unit 206 determines whether or not the standard deviation calculated in S1201 is less than a predetermined value. If the standard deviation is less than the predetermined value (for example, less than three), the processing proceeds to S1203, so that the first score reference will be determined as the score reference. For example, the formula (1) will be determined as the score reference. On the other hand, if the standard deviation is equal to or greater than the predetermined value (for example, equal to or greater than three), the processing proceeds to S1204, so that the second score reference, which is different from the first score reference, will be determined as the score reference. For example, the formula (6) will be designated as the score reference.

Accordingly, for example, in FIG. 7A, the formula (1) can be used as the score reference for the similarity to the individual ID1, and the formula (6) can be used as the score reference for the shooting date and time. In this case, for the selection, high scores are given to images in which the person of the individual ID1 appears and of which the shooting dates and times are scattered. That is, images with a different tendency can be selected for each feature amount, and it is possible to select images more in line with the user's intention.

Although the explanation has been given of the example in which, in S1202 of the present embodiment, the score references are switched between the first score reference and the second score reference based on the standard deviation calculated in S1201, the number of score references that can be switched to is not limited to two, and the switching can be performed among three or more score references. Further, although the explanation has been given of the example in which, in S1202 of the present embodiment, the score reference is switched based on the standard deviation calculated in S1201, there is no limitation as such. It is also possible to switch the score reference to be obtained according to the type of feature amount. Specifically, it is also possible to use a score reference that is uniquely determined for each feature amount with reference to a table that is set in advance in the album creation application and in which the types of feature amounts and the score references to be utilized are associated with each other. That is, the score reference may be switched for each type of feature amount.

In S1205, it is determined whether or not the processes of S1201 to S1204 have been completed for all the feature amount items. Here, if it is determined that the processes have not been completed, the processes from S1201 will be repeated. If it is determined that the processes have been completed, the score reference determination process of FIG. 12 will be completed.

The above is the explanation relating to the processing flow for carrying out the score reference determination process in the present embodiment. According to the present embodiment, by using an appropriate score reference according to the user image group and each feature amount, it is possible to select images more in line with the user's intention.

Other Embodiments

Although the explanation has been given of the example in which the process of automatically switching the score reference explained in the first embodiment and the score reference explained in the second embodiment is performed in the third embodiment, such a configuration in which the user can select the first score reference or the second score reference is also possible. For example, it is also possible that a UI screen (not illustrated in the drawings) provided with a check box that is indicative of whether or not to choose a mode of a greater emphasis on variation is presented to the user. Further, the processing explained in the second embodiment or the third embodiment may be performed in a case when this check box is checked, and the processing explained in the first embodiment may be performed in a case when the check box is not checked. Further, instead of the check box, it is also possible that a UI screen is configured so that the user can select a mode.

Further, in the above-described embodiments, the explanation has been given of the example in which the score reference is determined based on the analysis result of the user image group and the album candidate image group is scored based on the reference and the analysis result of the album candidate image group. Then, the example of selecting a layout image group from the album candidate image group based on the scores has been explained. However, it is only required that a reference is determined based on an analysis result of the user image group so that the layout image group can be selected based on the reference and an analysis result of the album candidate image group. That is, the reference that is obtained based on the analysis result of the user image group is a reference that reflects the intention (selection reference) of the user who selects the images. Therefore, if the layout image group is selected from the album candidate image group based on this selection reference, it is possible to select images more in line with the user's intention, relatively, compared with the case of selecting images based on the overall tendency of the album candidate image group.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
at least one processor and at least one memory coupled to the at least one processor and having stored therein instructions that, when executed by the at least one processor, cause the at least one processor and the at least one memory to cooperate to function as a plurality of units comprising:
(1) first designation unit configured to designate a first image group;
(2) a receiving unit configured to receive, from a user, selection of an image to be included in a second image group;
(3) an analysis unit configured to, for each image included in the second image group, analyze feature amounts of multiple types, the feature amounts of multiple types including (a) a feature amount of a first type and (b) a feature amount of a second type;
(4) a calculating unit configured to, based on an analysis result of the analysis unit, calculate respective standard deviations of the feature amounts of multiple types;
(5) a determination unit configured to, based on the standard deviations calculated by the calculating unit, determine a score reference used for scoring an image;
(6) a scoring unit configured to, based on the score reference, perform scoring of each image of the first image group;
(7) a selection unit configured to select, from the first image group, a plurality of images by prioritizing an image whose score, which is a result of the scoring, is higher; and
(8) an outputting unit configured to output information for displaying a layout on a display device, the layout being determined by using the plurality of images selected from the first image group by the selection unit,
wherein the determination unit determines the score reference such that where (a) the standard deviation of the feature amount of the first type is smaller than the standard deviation of the feature amount of the second type, (b) a first effect is an effect upon score addition which is performed in the scoring, the effect having been caused by closeness of (i) the feature amount of the first type of a specific image to be scored by the scoring to (ii) an average of the feature amounts of the first type of the second image group, and (c) a second effect is an effect upon the score addition which is performed in the scoring, the effect having been caused by closeness of (i) the feature amount of the second type of the specific image to (ii) an average of the feature amounts of the second type of the second image group, the first effect is larger than the second effect.

2. The image processing apparatus according to claim 1, wherein the determination unit is configured to determine the score reference that uses at least one of a standard deviation, interquartile deviation, and distribution shape of the analysis result of the second image group.

3. The image processing apparatus according to claim 1, wherein the determination unit is configured to determine the score reference that uses a difference between the analysis result of the second image group and an analysis result of an image scored by the scoring unit.

4. The image processing apparatus according to claim 1, wherein the determination unit is configured to determine the score reference with which a tendency of the analysis result of the second image group resembles a tendency of an analysis result of an image selected by the selection unit.

5. The image processing apparatus according to claim 1, wherein the determination unit is configured to determine the score reference with which an analysis result of an image selected by the selection unit is densely distributed.

6. The image processing apparatus according to claim 1, wherein the determination unit is configured to determine the score reference with which an analysis result of an image selected by the selection unit is sparsely distributed.

7. The image processing apparatus according to claim 1, wherein the determination unit is configured to determine the score reference with which a tendency of the analysis result of the second image group differs from a tendency of an analysis result of an image selected by the selection unit.

8. The image processing apparatus according to claim 1, wherein the determination unit is configured to have a plurality of score references and to switch the score reference for each kind of analysis result.

9. The image processing apparatus according to claim 8, wherein the determination unit is configured to switch the score reference for each kind of the analysis result according to whether or not the analysis result of the second image group is less than a predetermined value.

10. The image processing apparatus according to claim 8, wherein the determination unit is configured to determine the score reference that is uniquely determined for each kind of analysis result.

11. The image processing apparatus according to claim 1, wherein, as a score of each image, the scoring unit is configured to give an average value of scores obtained for each kind of analysis result, and
wherein the selection unit is configured to select images in an order from an image whose score is high.

12. The image processing apparatus according to claim 1, wherein, as a score of each image, the scoring unit is configured to give a highest score out of scores obtained for each kind of the analysis result, and
wherein the selection unit is configured to select images in an order from an image whose score is high.

13. The image processing apparatus according to claim 1, wherein, as an analysis result, the analysis unit is configured to output at least one image feature out of a degree of focus, a result of face detection, and a result of object determination, which correspond to image features obtained by analyzing each image.

14. The image processing apparatus according to claim 1, wherein the selection unit is configured to select at least one image from the second image group.

15. The image processing apparatus according to claim 1, wherein the second image group is included in the first image group.

16. The image processing apparatus according to claim 1, wherein the at least one processor and the at least one memory coupled to the at least one processor and having stored thereon instructions that, when executed by the at least one processor, further cooperate to function as a creation unit configured to create image data by executing layout by use of an image selected by the selection unit.

17. An image processing method comprising:
designating a first image group;
receiving, from a user, selection of an image to be included in a second image group;
for each image included in the second image group, analyzing feature amounts of multiple types, the feature amounts of multiple types including (a) a feature amount of a first type and (b) a feature amount of a second type;
based on an analysis result of the analyzing, calculating respective standard deviations of the feature amounts of multiple types;
based on the standard deviations calculated by the calculating, determining a score reference used for scoring an image;
based on the score reference, performing scoring of each image of the first image group;
selecting, from the first image group, a plurality of images by prioritizing an image whose score, which is a result of the scoring, is higher; and
outputting information for displaying a layout on a display device, the layout being determined by using the plurality of images selected from the first image group in the selecting,
wherein the determining determines the score reference such that where (a) a standard deviation of the feature amount of the first type is smaller than a standard deviation of the feature amount of the second type, (b) a first effect is an effect upon score addition which is performed in the scoring, the effect having been caused by closeness of (i) the feature amount of the first type of a specific image to be scored by the scoring to (ii) an average of the feature amounts of the first type of the second image group, and (c) a second effect is an effect upon the score addition which is performed in the scoring, the effect having been caused by closeness of (i) the feature amount of the second type of the specific image to (ii) an average of the feature amounts of the second type of the second image group, the first effect is larger than the second effect.

18. A non-transitory computer-readable storage medium storing a program that causes a computer to execute an image processing method, the image processing method comprising:
designating a first image group;
receiving, from a user, selection of an image to be included in a second image group;
for each image included in the second image group, analyzing feature amounts of multiple types, the feature amounts of multiple types including (a) a feature amount of a first type and (b) a feature amount of a second type;
based on an analysis result of the analyzing, calculating respective standard deviations of the feature amounts of multiple types;
based on the standard deviations calculated by the calculating, determining a score reference used for scoring an image;
based on the score reference, performing scoring of each image of the first image group;
selecting, from the first image group, a plurality of images by prioritizing an image whose score, which is a result of the scoring, is higher; and
outputting information for displaying a layout on a display device, the layout being determined by using the plurality of images selected from the first image group in the selecting,
wherein the determining determines the score reference such that where (a) a standard deviation of the feature amount of the first type is smaller than a standard deviation of the feature amount of the second type, (b) a first effect is an effect upon score addition which is performed in the scoring, the effect having been caused by closeness of (i) the feature amount of the first type of a specific image to be scored by the scoring to (ii) an average of the feature amounts of the first type of the second image group, and (c) a second effect is an effect upon the score addition which is performed in the scoring, the effect having been caused by closeness of (i) the feature amount of the second type of the specific image to (ii) an average of the feature amounts of the second type of the second image group, the first effect is larger than the second effect.

19. The image processing apparatus according to claim 1, wherein the at least one processor and the at least one memory further cooperate to function as:
a layout unit configured to determine the layout by using the image selected from the first image group by the selection unit.

20. The image processing apparatus according to claim 1, wherein the at least one processor and the at least one memory further cooperate to function as:

a correction unit configured to correct the layout determined by the layout unit.

* * * * *